(12) United States Patent
Fan et al.

(10) Patent No.: US 11,818,746 B2
(45) Date of Patent: Nov. 14, 2023

(54) SYSTEM AND METHOD FOR NETWORK AUTOMATION IN SLICE-BASED NETWORK USING REINFORCEMENT LEARNING

(71) Applicant: NEC Laboratories Europe GmbH, Heidelberg (DE)

(72) Inventors: Linghang Fan, Woking (GB); Andres Garcia-Saavedra, Madrid (ES); Hassan Al-Kanani, Iver (GB); Iskren Ianev, Lower Earley (GB)

(73) Assignee: NEC CORPORATION, Tokyo (JP)

( * ) Notice: Subject to any disclaimer, the term of this patent is extended or adjusted under 35 U.S.C. 154(b) by 123 days.

(21) Appl. No.: 17/273,312

(22) PCT Filed: Sep. 6, 2019

(86) PCT No.: PCT/EP2019/073908
§ 371 (c)(1),
(2) Date: Mar. 4, 2021

(87) PCT Pub. No.: WO2020/049181
PCT Pub. Date: Mar. 12, 2020

(65) Prior Publication Data
US 2021/0337555 A1 Oct. 28, 2021

(30) Foreign Application Priority Data
Sep. 7, 2018 (EP) .................................... 18193309

(51) Int. Cl.
*H04W 72/543* (2023.01)
*H04W 28/24* (2009.01)
(Continued)

(52) U.S. Cl.
CPC ....... *H04W 72/543* (2023.01); *H04L 41/0895* (2022.05); *H04L 41/0896* (2013.01);
(Continued)

(58) Field of Classification Search
CPC ............................ H04W 72/087; H04W 28/24
See application file for complete search history.

(56) References Cited

U.S. PATENT DOCUMENTS

| 2014/0229210 A1* | 8/2014 | Sharifian | ............ G06Q 10/0631 |
| | | | 705/7.29 |
| 2016/0105821 A1* | 4/2016 | Senarath | ............... H04W 28/24 |
| | | | 370/329 |

(Continued)

OTHER PUBLICATIONS

3GPP, "3rd Generation Partnership Project; Technical Specification Group Services and System Aspects; Study of Enablers for Network Automation for 5G (Release 16)", 3GPP Standard; Technical Report; 3GPP TR 23.791, 3rd Generation Partnership Project (3GPP), Mobile Competence Centre ; 650, Route Des Lucioles ; F-06921 Sophia-Antipolis Cedex ; France, vol. SA WG2. No. V16.2.0, Jun. 11, 2019 (Jun. 11, 2019), pp. 1-124, XP051753968.

(Continued)

*Primary Examiner* — Jay L Vogel
(74) *Attorney, Agent, or Firm* — Leydig, Voit & Mayer, Ltd.

(57) ABSTRACT

A method for facilitating allocation of network resources to at least one slice in a communication network includes obtaining information identifying a mapping between network resource allocations and a respective quality of experience (QoE) associated with a user and obtaining information relating to a quality of service (QoS) tolerance for a particular QoE. The method includes providing to a controller for allocating at least a portion of the network resources to the at least one slice: i) the information identifying a mapping between network resource allocations and a QoE; ii) the information relating to the QoS tolerance; and iii) information identifying a current QoE and a target QoE associated with at least one user.

16 Claims, 11 Drawing Sheets

(51) Int. Cl.
    *H04L 41/40*        (2022.01)
    *H04L 43/20*        (2022.01)
    *H04L 43/08*        (2022.01)
    *H04L 41/0895*      (2022.01)
    *H04L 41/0896*      (2022.01)
    *H04L 41/342*       (2022.01)
    *H04L 41/344*       (2022.01)

(52) U.S. Cl.
    CPC .......... *H04L 41/342* (2022.05); *H04L 41/344* (2022.05); *H04L 41/40* (2022.05); *H04L 43/08* (2013.01); *H04L 43/20* (2022.05); *H04W 28/24* (2013.01)

(56) References Cited

U.S. PATENT DOCUMENTS

| | | | | |
|---|---|---|---|---|
| 2016/0212758 | A1* | 7/2016 | Leung | H04W 72/0473 |
| 2016/0352924 | A1* | 12/2016 | Senarath | H04M 15/66 |
| 2017/0126792 | A1* | 5/2017 | Halpern | H04L 41/0894 |
| 2017/0317894 | A1 | 11/2017 | Dao et al. | |
| 2017/0332282 | A1* | 11/2017 | Dao | H04L 1/0026 |
| 2018/0270347 | A1* | 9/2018 | Rangarajan | H04L 41/5067 |
| 2018/0287891 | A1* | 10/2018 | Shaw | H04W 24/02 |
| 2020/0029242 | A1* | 1/2020 | Andrews | H04W 28/0268 |

OTHER PUBLICATIONS

3GPP, "3rd Generation Partnership Project; Technical Specification Group Services and System Aspects; Study of Enablers for Network Automation for 5G (Release 16)", 3GPP Standard; Technical Report; 3GPP TR 23.791, 3rd Generation Partnership Project (3GPP), Mobile Competence Centre ; 650, Route Des Lucioles ; F-06921 Sophia-Antipolis Cedex ; France, vol. SA WG2, No. V1.0.0, Sep. 6, 2018 (Sep. 6, 2018), pp. 1-66, XP051475227.

Huawei et al: "Solution for QoS Provisioning and Adjustment", 3GPP Draft; S2-183635 Solution for QoS Provisioning and Adjustment, $3^{rd}$ Generation Partnership Project (3GPP), Mobile Competence Centre ; 650, Route Des Lucioles ; F-06921 Sophia-Antipolis Cedex ; FRA vol. SA WG2, No. Sanya, China; Apr. 16-20, 2018, XP051437936, pp. 1-5.

* cited by examiner

SYSTEM AND METHOD FOR NETWORK AUTOMATION IN SLICE-BASED NETWORK USING REINFORCEMENT LEARNING

CROSS-REFERENCE TO PRIOR APPLICATIONS

This application is a U.S. National Phase Entry, under 35 U.S.C. § 371, of International Application No. PCT/EP2019/073908, filed on Sep. 6, 2019, which claims priority to European Patent Application No. EP 18193309.4, filed on Sep. 7, 2018. The International Application was published in English on Mar. 12, 2020 as WO 2020/0049181 under PCT Article 21(2), which is hereby incorporated by reference.

FIELD

In an embodiment, the present invention relates to a communication system. In an embodiment, the invention has particular but not exclusive relevance to wireless communication systems and devices thereof operating according to the 3rd Generation Partnership Project (3GPP) standards or equivalents or derivatives thereof. In an embodiment, the invention has particular although not exclusive relevance to network automation in the so-called '5G' (or 'Next Generation') systems.

BACKGROUND

3GPP Working Groups are currently defining the 5G system and the 3GPP TSG SA WG2 (SA2) is specifying the system architecture and procedures for 5G system. Within SA2, a study item Study of enablers for Network Automation for 5G (eNA) has been created to study requirements and key issues of network automation for 5G, and the results of this study has been documented in a technical report (TR) 23.791 V0.5.0.

Recently, new study has been proposed is SA2 to investigate how to use user QoE data to support QoS profile provisioning in TR 23.791 V0.5.0.

SUMMARY

In an embodiment, the present invention provides a method for facilitating allocation of network resources to at least one slice in a communication network. The method includes obtaining information identifying a mapping between network resource allocations and a respective quality of experience (QoE) associated with a user and obtaining information relating to a quality of service (QoS) tolerance for a particular QoE. The method includes providing to a controller for allocating at least a portion of the network resources to the at least one slice: i) the information identifying a mapping between network resource allocations and a QoE; ii) the information relating to the QoS tolerance; and iii) information identifying a current QoE and a target QoE associated with at least one user.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
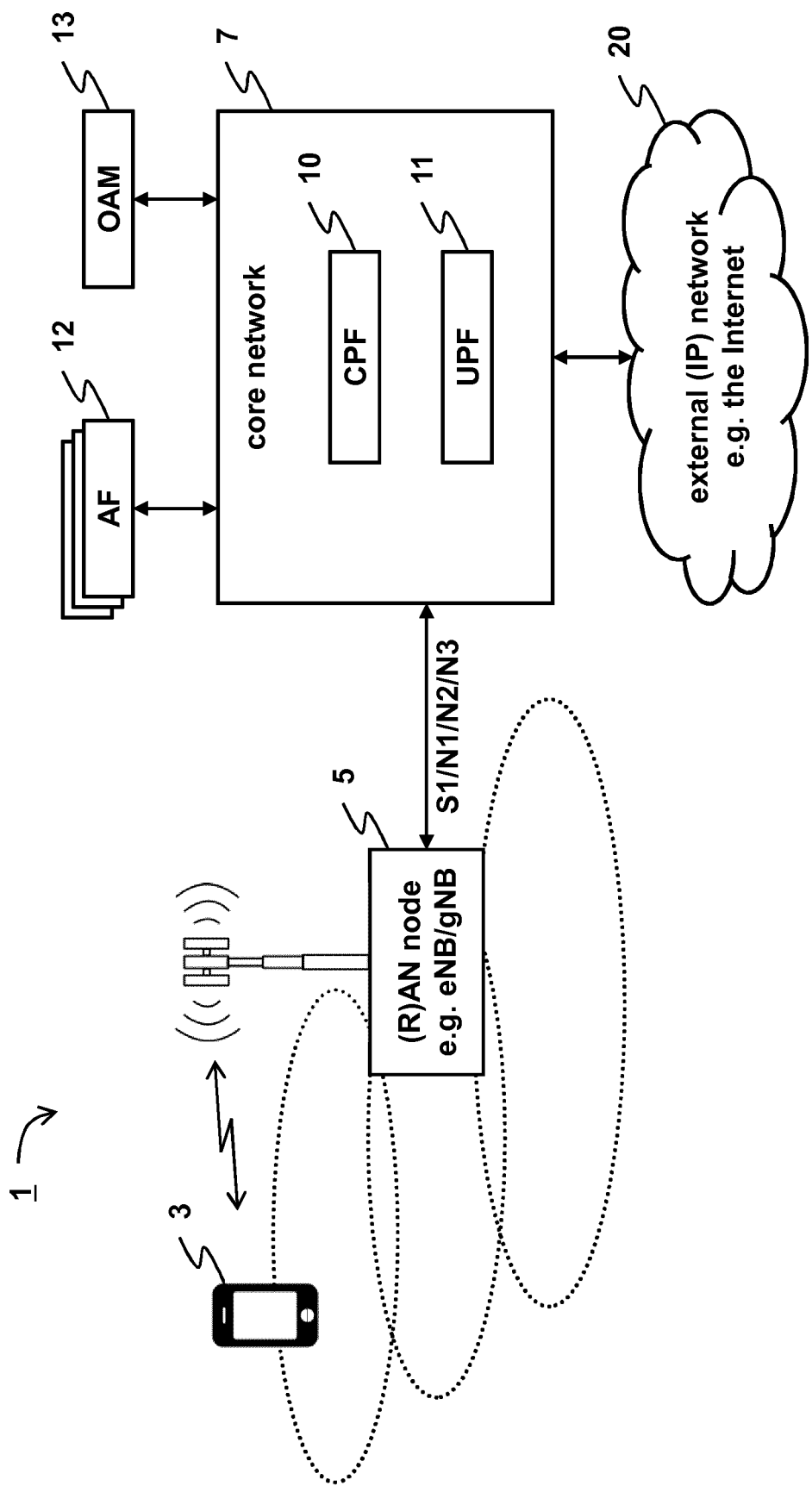
FIG. 1 illustrates schematically a generic mobile (cellular or wireless) telecommunication system to which embodiments of the invention may be applied.

Currently, OAM system manages network resources based on network data and KPIs, which measure and estimate network quality at the network level without monitoring the service quality at the user level or service application level. Examples of network data/KPIs are throughput (e.g., Mbit/s), delay (e.g., msec/packet) or Ethernet/IP packet or TCP segment loss rate. However, the user QoE is not necessarily consistent with the network KPI performance. It is a common problem for operators that users complain about poor quality of services while the key network KPIs are estimated to be within satisfactory limits. This usually leads to network over-provisioning, operational overhead and wastage of network resources. This problem becomes more critical with the support of multiple network slices as each network slice may have different QoE requirements. This clearly demonstrates that there is a need to efficiently allocate network resources while targeting user QoE satisfaction, especially in slice-based networks.

Moreover, in future networks where user and network data is growing exponentially, it becomes an increasingly challenging and complex to adjust/optimise the network manually in order to deliver highly optimum service quality for users. There is therefore a need to apply machine learning and automation in the network to reduce the cost of network operation.

QoS in 5G has diverse characteristics brought up by the introduction of new applications and services. This may result in new mechanisms to accommodate new QoS requirements. For example, some non-standardised QoS parameters can be defined and negotiated between OTT service providers and network operators, which are tailored to the nature of new applications/services and are implemented based on network operators' policy. Current QoS provisioning cannot be adaptive enough to accommodate a substantial range of new services that have different QoS requirements and QoS profiles.

In an embodiment, the present invention provides methods and associated apparatuses that address or at least alleviate (at least some of) the above issues.

In one aspect, the present invention provides a method for facilitating allocation of network resources to at least one slice in a communication network, the method comprising: obtaining information identifying a mapping between network resource allocations and a respective quality of experience (QoE) associated with a user; obtaining information relating to a quality of service (QoS) tolerance for a particular QoE; providing to a controller for allocating at least a portion of said network resources to said at least one slice: i) said information identifying a mapping between network resource allocations and a QoE; ii) said information relating to said QoS tolerance; and iii) information identifying a current QoE and a target QoE associated with at least one user.

In an embodiment, the present invention provides a method for allocating network resources to at least one slice in a communication network, the method comprising: obtaining: i) information identifying a mapping between network resource allocations and a quality of experience (QoE) associated with a user; ii) said information relating to a quality of service (QoS) tolerance for a particular QoE; and iii) information identifying a current QoE and a target QoE associated with at least one user; and allocating at least a portion of said network resources to said at least one slice based on said QoS tolerance and said current QoE and said target QoE.

In an embodiment, the present invention provides a method for configuring a Quality of Service (QoS) to be used in a communication network, the method comprising: determining at least one QoS parameter associated with a service to be provided; signaling said determined at least one QoS parameter to another node using a bitmap comprising at least a first field and a second field, wherein: the first field comprises a plurality of bits, each bit indicating a respective QoS parameter selected from: a resource type QoS parameter, a priority level QoS parameter, a packet delay budget QoS parameter, a packet error rate QoS parameter, an averaging window QoS parameter, and a maximum data burst volume QoS parameter; and the second field is configurable to indicate a QoS parameter different to said QoS parameters indicated via the first field.

In an embodiment, the present invention provides a method for configuring a Quality of Service (QoS) to be used in a communication network, the method comprising: receiving signaling indicating at least one QoS parameter using a bitmap comprising at least a first field and a second field, wherein: the first field comprises a plurality of bits, each bit indicating a respective QoS parameter selected from: a resource type QoS parameter, a priority level QoS parameter, a packet delay budget QoS parameter, a packet error rate QoS parameter, an averaging window QoS parameter, and a maximum data burst volume QoS parameter; and the second field is configurable to indicate a QoS parameter different to said QoS parameters indicated via the first field; and determining at least one QoS parameter associated with a service to be provided based on said bitmap.

In an embodiment, the present invention provides a network function for facilitating allocation of network resources to at least one slice in a communication network, the network function comprising: means for obtaining information identifying a mapping between network resource allocations and a respective quality of experience (QoE) associated with a user; means for obtaining information relating to a quality of service (QoS) tolerance for a particular QoE; means for providing to a controller for allocating at least a portion of said network resources to said at least one slice: i) said information identifying a mapping between network resource allocations and a QoE; ii) said information relating to said QoS tolerance; and iii) information identifying a current QoE and a target QoE associated with at least one user.

In an embodiment, the present invention provides a network function for allocating network resources to at least one slice in a communication network, the network function comprising: means for obtaining: i) information identifying a mapping between network resource allocations and a quality of experience (QoE) associated with a user; ii) said information relating to a quality of service (QoS) tolerance for a particular QoE; and iii) information identifying a current QoE and a target QoE associated with at least one user; and means for allocating at least a portion of said network resources to said at least one slice based on said QoS tolerance and said current QoE and said target QoE.

In an embodiment, the present invention provides a network function for configuring a Quality of Service (QoS) to be used in a communication network, the network function comprising: means for determining at least one QoS parameter associated with a service to be provided; means for signaling said determined at least one QoS parameter to another node using a bitmap comprising at least a first field and a second field, wherein: the first field comprises a plurality of bits, each bit indicating a respective QoS parameter selected from: a resource type QoS parameter, a priority level QoS parameter, a packet delay budget QoS parameter, a packet error rate QoS parameter, an averaging window QoS parameter, and a maximum data burst volume QoS parameter; and the second field is configurable to indicate a QoS parameter different to said QoS parameters indicated via the first field.

In an embodiment, the present invention provides a network function for configuring a Quality of Service (QoS) to be used in a communication network, the network function comprising: means for receiving signaling indicating at least one QoS parameter using a bitmap comprising at least a first field and a second field, wherein: the first field comprises a plurality of bits, each bit indicating a respective QoS parameter selected from: a resource type QoS parameter, a priority level QoS parameter, a packet delay budget QoS parameter, a packet error rate QoS parameter, an averaging window QoS parameter, and a maximum data burst volume QoS parameter; and the second field is configurable to indicate a QoS parameter different to said QoS parameters indicated via the first field; and means for determining at least one QoS parameter associated with a service to be provided based on said bitmap.

In an embodiment, the present invention provides a network function for facilitating allocation of network resources to at least one slice in a communication network, the network function comprising a controller, and a transceiver, wherein the controller is configured to: obtain information identifying a mapping between network resource allocations and a respective quality of experience (QoE) associated with a user; obtain information relating to a quality of service (QoS) tolerance for a particular QoE; provide to a controller for allocating at least a portion of said network resources to said at least one slice: i) said information identifying a mapping between network resource allocations and a QoE; ii) said information relating to said QoS tolerance; and iii) information identifying a current QoE and a target QoE associated with at least one user.

In an embodiment, the present invention provides a network function for allocating network resources to at least one slice in a communication network, the network function comprising a controller, and a transceiver, wherein the controller is configured to: obtain: i) information identifying a mapping between network resource allocations and a quality of experience (QoE) associated with a user; ii) said information relating to a quality of service (QoS) tolerance for a particular QoE; and iii) information identifying a current QoE and a target QoE associated with at least one user; and allocate at least a portion of said network resources to said at least one slice based on said QoS tolerance and said current QoE and said target QoE.

In an embodiment, the present invention provides a network function for configuring a Quality of Service (QoS) to be used in a communication network, the network function comprising a controller, and a transceiver, wherein the controller is configured to: determine at least one QoS parameter associated with a service to be provided; signal said determined at least one QoS parameter to another node using a bitmap comprising at least a first field and a second field, wherein: the first field comprises a plurality of bits, each bit indicating a respective QoS parameter selected from: a resource type QoS parameter, a priority level QoS parameter, a packet delay budget QoS parameter, a packet error rate QoS parameter, an averaging window QoS parameter, and a maximum data burst volume QoS parameter; and the second field is configurable to indicate a QoS parameter different to said QoS parameters indicated via the first field.

In an embodiment, the present invention provides a network function for configuring a Quality of Service (QoS) to be used in a communication network, the network function comprising a controller, and a transceiver, wherein the controller is configured to: receive signaling indicating at least one QoS parameter using a bitmap comprising at least a first field and a second field, wherein: the first field comprises a plurality of bits, each bit indicating a respective QoS parameter selected from: a resource type QoS parameter, a priority level QoS parameter, a packet delay budget QoS parameter, a packet error rate QoS parameter, an averaging window QoS parameter, and a maximum data burst volume QoS parameter; and the second field is configurable to indicate a QoS parameter different to said QoS parameters indicated via the first field; and determine at least one QoS parameter associated with a service to be provided based on said bitmap.

Aspects of the invention extend to corresponding systems and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Overview

FIG. 1 schematically illustrates a mobile (cellular or wireless) telecommunication system 1 to which the embodiments of the present invention are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 10 and user plane functions (UPFs) 11. In this example, the core network 7 is coupled to at least one AF 12 (e.g. via the Internet) and an OAM 13 system. It will be appreciated that the core network 7 may also include one or more of the functions shown in FIGS. 5 to 11, such as: at least one PCF; the SMF; the NWDAF; and the NEF. The OAM system 13 may, for example, include one or more of: the Central Controller and at least one Agent of Slice; the OAM MF(s); and the MDAS. The Central Controller and Agent(s) of Slice can be integrated into an OAM MF. From the core network 7, connection to an external IP network 20 (such as the Internet) is also provided.

In order to support various types of users (UEs) and services (service providers), the system 1 communicates data for each UE 3 using one or more associated network slice. The components of this system 1 are configured to allocate network resources across network slices such that a target UE's QoE is satisfied, in an automated machine-learning based manner. In order to do so, the system 1 employs a machine learning (ML) based architecture with a plurality of agents (e.g. one agent per slice) which are responsible for allocating network resources based on a target QoE.

The ML-based architecture includes a central controller that uses QoE targets rather than QoS targets and learns the best QoS parameters to meet such QoE targets. When there is a resource deficit (when not all QoE targets can be met) the controller is able to make compromises, using an appropriate QoS-to-QoE gradient, to discern between slices that have a QoE model less sensitive or more sensitive to QoS parameter changes.

The system 1 also employs a QoS architecture that supports non-standard applications. This QoS architecture may be beneficially used for facilitating negotiation between OTT service providers and operators in order to meet the requirements of 5G applications. Thus, beneficially, the QoS architecture used in this system 1 may be used to support other QoS parameters than the six standard QoS parameters currently defined in 3GPP (i.e. Resource Type, Priority level, Packet Delay Budget, Packet Error Rate, Averaging Window, and Maximum Data Burst Volume).

The main features of this exemplary QoS architecture include one or more of the following:
  i) support for flexible QoS profiles based on QoS bitmap, in which, for example:
    each bit represents one QoS parameter;
    the length of the QoS bitmap may be flexible (e.g. it may be set to 32 bit, 64 bits, 128 bits, as appropriate);
    if the QoS bitmap is 32 bits, then 16 bits may be allocated to standard QoS parameters and 16 bits may be allocated to non-standard QoS parameters;
  ii) support for new applications defined by OTT service providers:
    non-standard or new parameters may be included (e.g. after standard QoS parameters);
    for each QoS type, there are two parts: a standard QoS parameter part (defined by 3GPP); and a non-standard/non-3GPP QoS parameter part (which may be defined by network operators and OTT service providers);
    some QoS parameters may be normalized QoS parameters in order to facilitate a particular OTT/operator/vendor.

User Equipment (UE)

Figure 2:
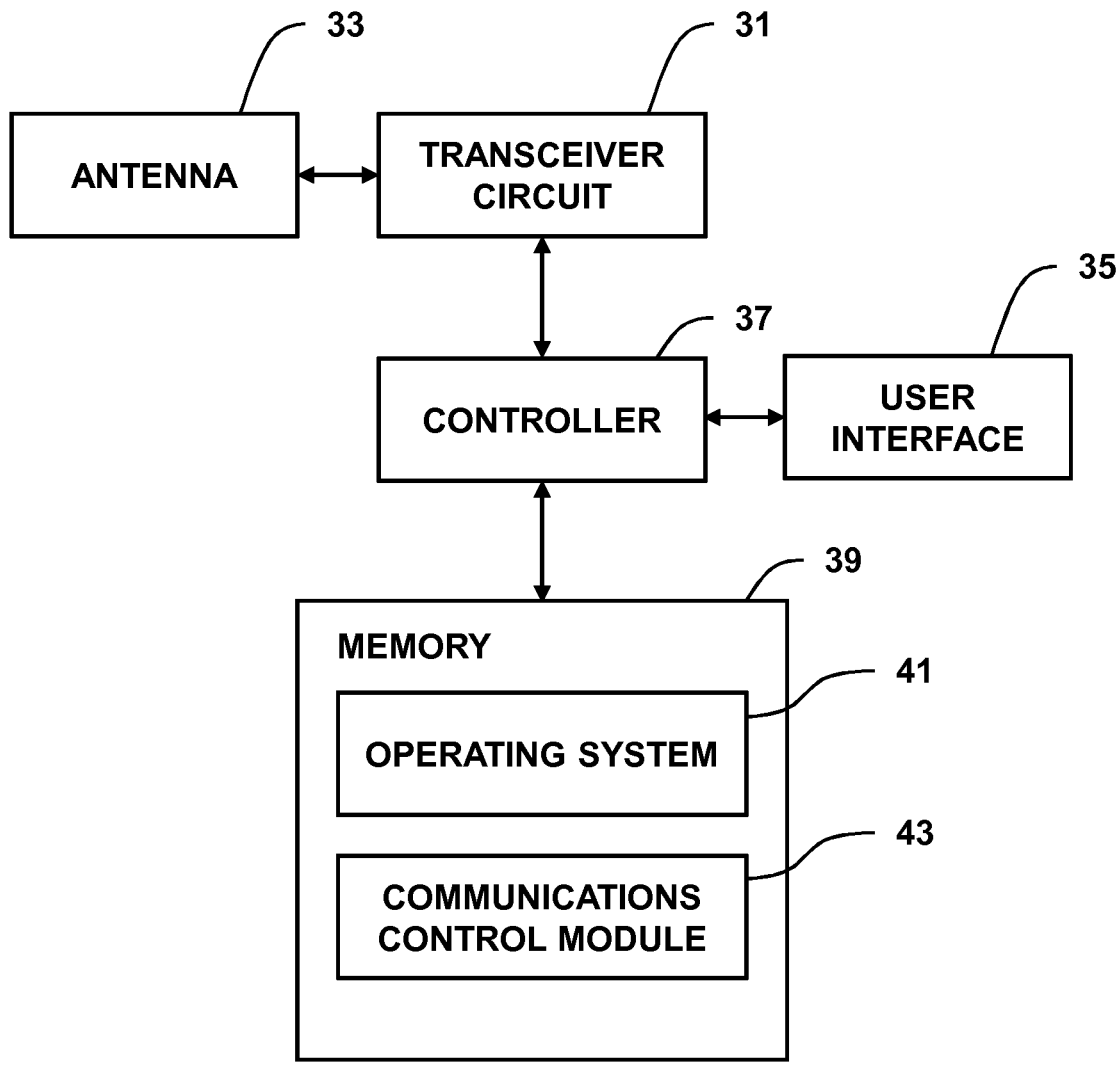
FIG. 2 is a schematic block diagram of a mobile device (user equipment) forming part of the system shown in FIG. 1.

FIG. 2 is a block diagram illustrating the main components of the UE (mobile device 3) shown in FIG. 1. As shown, the UE includes a transceiver circuit 31 which is operable to transmit signals to and to receive signals from the connected node(s) via one or more antenna 33. Although not necessarily shown in FIG. 2, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signaling messages and uplink/downlink data packets between the UE 3 and other nodes, including (R)AN nodes 5, core network nodes, and application functions.

(R)AN Node

Figure 3:
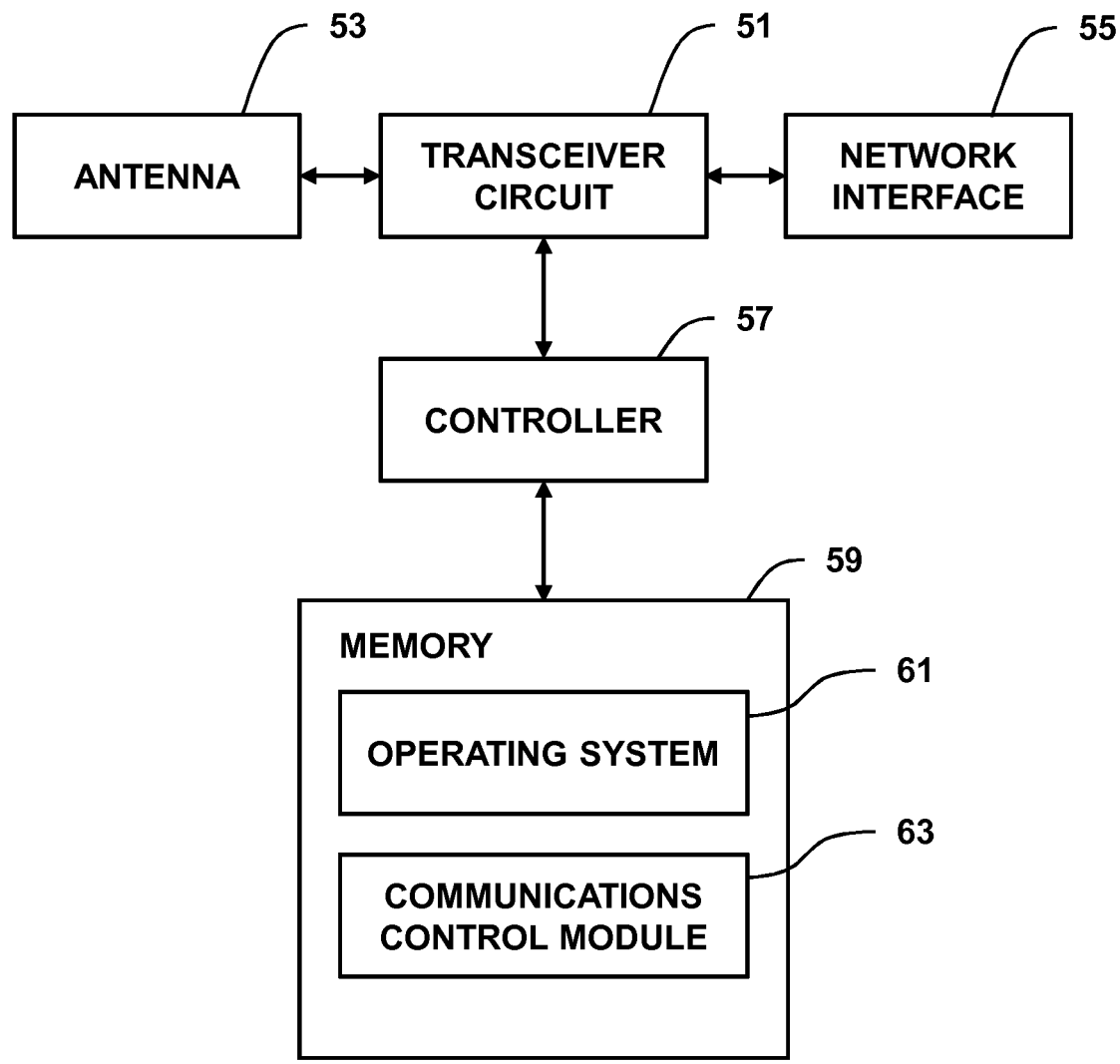
FIG. 3 is a schematic block diagram of a base station apparatus forming part of the system shown in FIG. 1.

FIG. 3 is a block diagram illustrating the main components of an exemplary (R)AN node 5 (base station) shown in FIG. 1. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3).

A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signaling between the (R)AN node 5 and other nodes, such as the UE 3 and the core network nodes/AFs 12. Such signaling includes appropriately formatted requests and responses relating to network automation in slice-based networks (using reinforcement learning) and/or flexible QoS profiles (based on a QoS bitmap and/or the like).

Core Network Node

Figure 4:
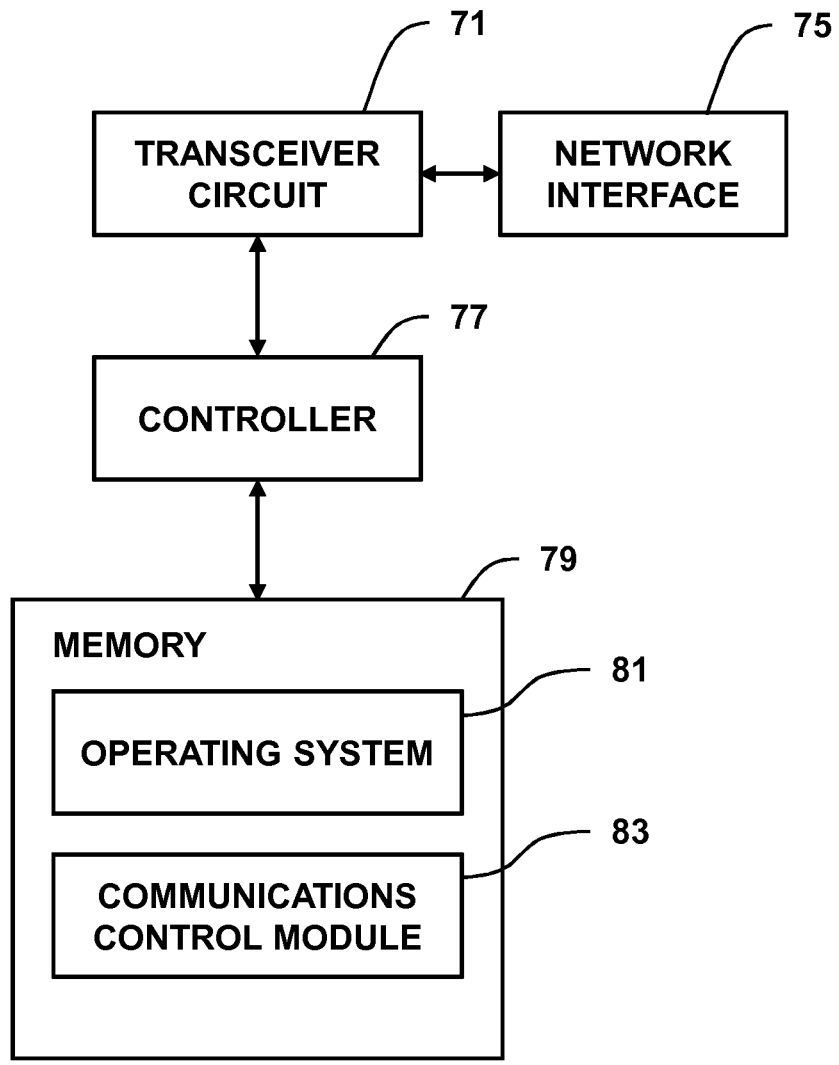
FIG. 4 is a schematic block diagram of a core network node (or OAM node/application function) forming part of the system shown in FIG. 1.

FIG. 4 is a block diagram illustrating the main components of a generic core network node (or function) shown in FIGS. 5 to 11. It will be appreciated that the same block diagram may be applicable to the AF 12 and the nodes of the OAM as well. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, the AFs 12, and other core network nodes. Such signaling includes appropriately formatted requests and responses relating to network automation in slice-based networks (using reinforcement learning) and/or flexible QoS profiles (based on a QoS bitmap and/or the like).

In order to address the aforementioned problems, the specification offers multiple exemplary solutions in order to deal with the QoS provisioning for network automation under different deployment/implementation scenarios.

Exemplary embodiments include:
  Embodiment 1: new ML-based multi-agent architecture, which can optimally allocate network resources to meet a target user's QoE in slice-based networks;
  Embodiment 2: New QoS architecture, which can support non-standardised applications

Embodiment 1: ML-Based Multi-Agent Architecture, which can Efficiently Allocate Network Resource Against Target User QoE in Slice-Based Network The main idea of this embodiment is to efficiently allocate network resources across network slices such that a target user's QoE is satisfied, in an automated machine-learning based manner.

In order to efficiently allocate network resources across the multiple network slices, the inventors propose a ML-based multi-agent architecture.

Figure 5:
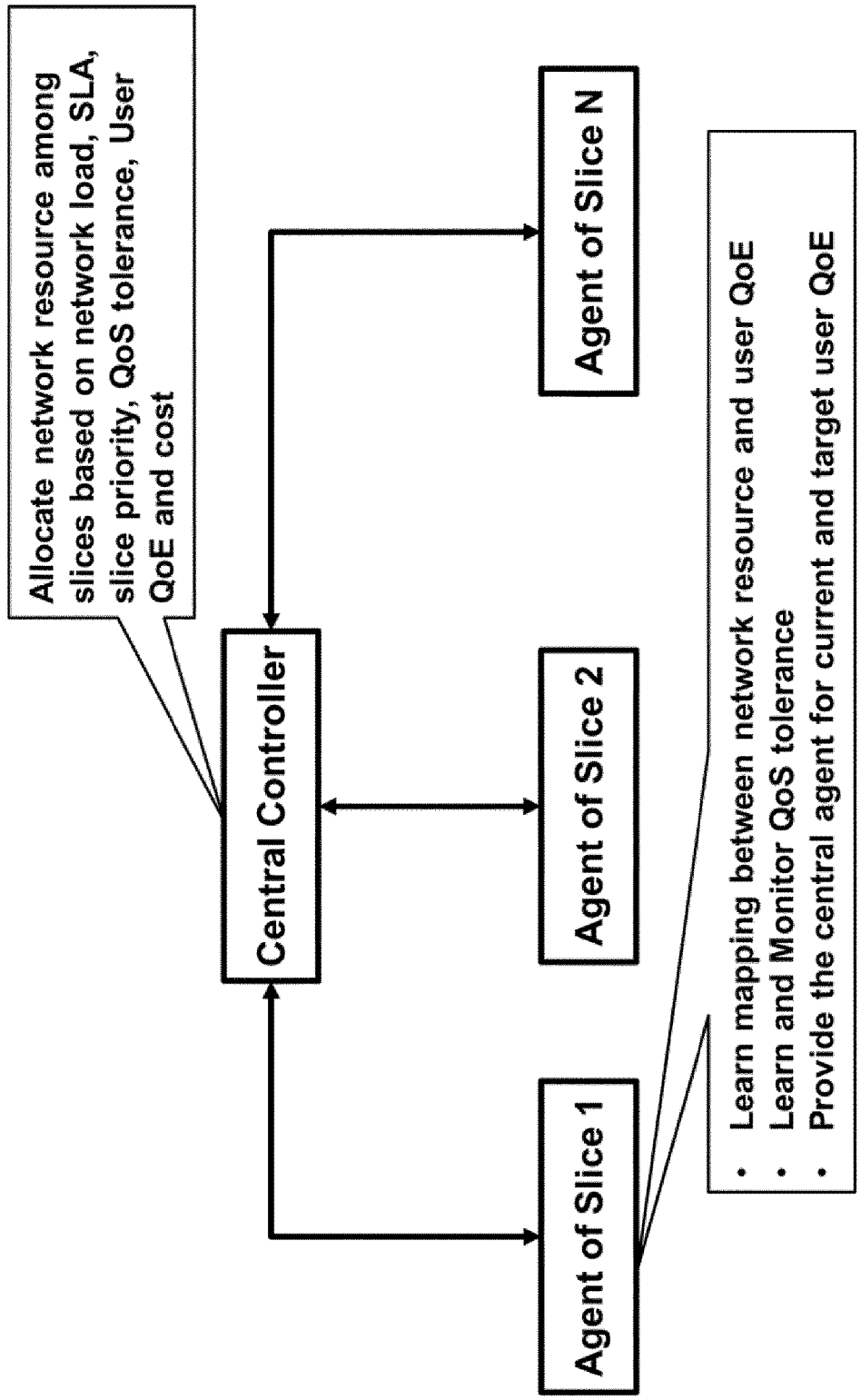
FIG. 5 illustrates schematically an exemplary machine-learning based architecture in accordance with embodiments of the present invention.

FIG. 5 illustrates schematically an example of such an ML-based Multi-Agent Architecture.

As shown in FIG. 5, this ML-based multi-Agent Architecture has a central controller and one agent per network slice. The main task of the central controller is to allocate network resources across slices based on different factors, such as network load, slice priority, QoS tolerance, user QoE and cost, or any other relevant parameters/attributes. Slice priority is the priority between the different slices, and is normally decided by the operators' policy. The term QoS tolerance used herein refers to a QoS-to-QoE gradient, which is a function mapping the sensitivity of the slices' or users' QoE to changes in their QoS parameters (latency, throughput, CPUs, etc.). For instance, if a slice has an average target QoE X (e.g. MOS score) and requires latency Y (QoS parameter) to meet the target, the QoS tolerance function would indicate the percentage of loss/gain QoE G such that QoE is G*X upon increases/decreases in latency performance H (when latency experience by the service is H*Y). The QoS may be a vector of network/computing parameters. In this way, the central controller can use this information to make compromises (e.g. minimize the amount of QoE target violations) in situations of resource deficit or conflicts. In other words, the central controller is configured to use the QoS-to-QoE gradient to estimate how costly it is, in terms of QoE changes, to change some QoS parameter(s)/network resources.

Cost is the price needed to be paid for a slice to use the network resource against a target QoE.

There are three main tasks for the agent in a network slice:

Learn mapping between network resources (i.e. network QoS) and user QoE.

Learn QoS-to-QoE gradient (i.e. QoS tolerance parameter). This parameter is essentially the gradient of the mapping function learnt in step 1 (i.e., how QoE changes as a function of the allocated network resources). In this way, in the presence of resource deficit, the central controller can decide the compromise of network resources allocated to each slice with minimal user QoE violation. Given the ML-based nature of this problem, it is assumed this parameter is also an output of the ML model.

Provide the central controller current and target user QoE. The central controller uses the learnt models and the QoS-to-QoE gradient (i.e. QoS tolerance parameter) to allocate network resources across network slices optimally with minimal user QoE violation.

Reinforcement learning is preferred to be used by the agent to manage resource within a network slice, and model can be trained based on the user QoE data.

Agent is the agent in the network slice, Environment is the whole network system, Reward is QoE, State is the network performance, and Action is the agent selecting network parameters.

Figure 6:
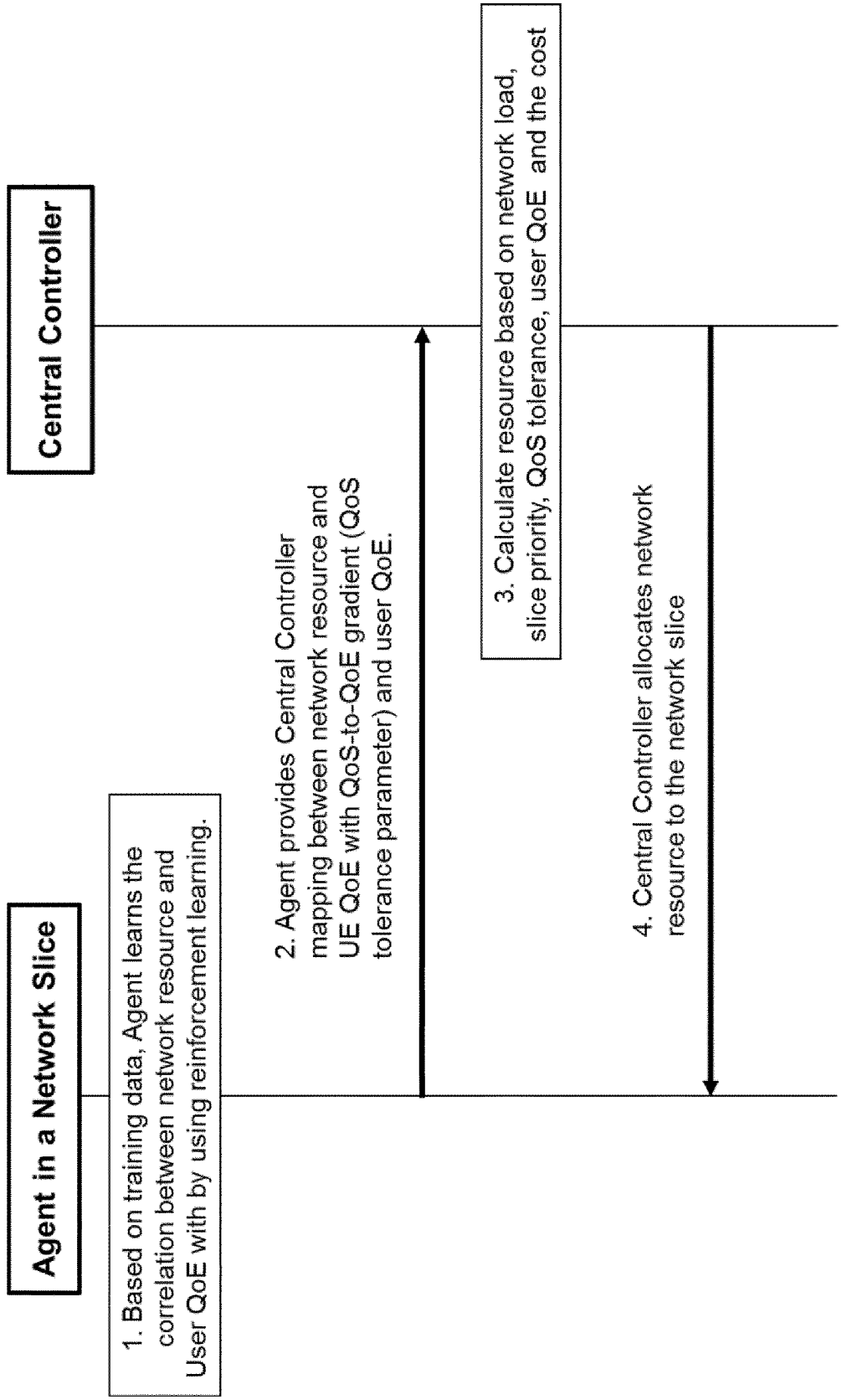
FIGS. 6 to 8 are timing (signalling) diagram illustrating some exemplary ways in which network resource allocation may be carried out using the machine-learning based architecture of FIG. 5.

FIG. 6 demonstrates an exemplary procedure for network resource allocation in multiple network slices environment.

Step 1: Based on training data, Agent learns the mapping between network resource and user QoE by using reinforcement learning. The network resources are end-to-end and include both physical and virtualised resources such as radio network, transport and core network resources. Network resource parameters include for example, bandwidth, power, modulation scheme, the number of servers or any other related parameters/attributes. If value iteration approach is adopted, the residual gradient algorithm is used for the mapping between network resource and user QoE. If Q-learning approach is adopted, state/action pair to Q-function is resource allocation for each user/resource allocation to their QoE.

Step 2: Agent provides the Central Controller current and target user QoE. Agent also provides its QoS tolerance in the network slice, and mapping between network resource and QoE with QoS-to-QoE gradient. If value iteration approach is adopted, the residual gradient algorithm is used for the mapping between network resource and user QoE. If Q-learning approach is adopted, state/action pair to Q-function is resource allocation for each user/resource allocation to their QoE.

Step 3: The central controller calculates the resource based on network resource allocation state in the entire network, slice priority, QoS tolerance in the network slice, current and target QoE and the cost to change resource allocation among network slices or any other one parameter or combination of relevant parameters/attributes defined by the network operators or service providers.

Step 4: Central Controller allocates network resource to the required network slice.

Scenario 1: MDAS Requests Network Policy from OAMMF

In the 5G networks, both the central controller and the agent of slice can be part of the OAM system. They can potentially be implemented in the Orchestrator and/or slice management functions (e.g. Slice Management Function and/or Slice Subnet Management Function). The central controller and the agent of slice can also be implemented as a part of 5G network function system.

Figure 7:
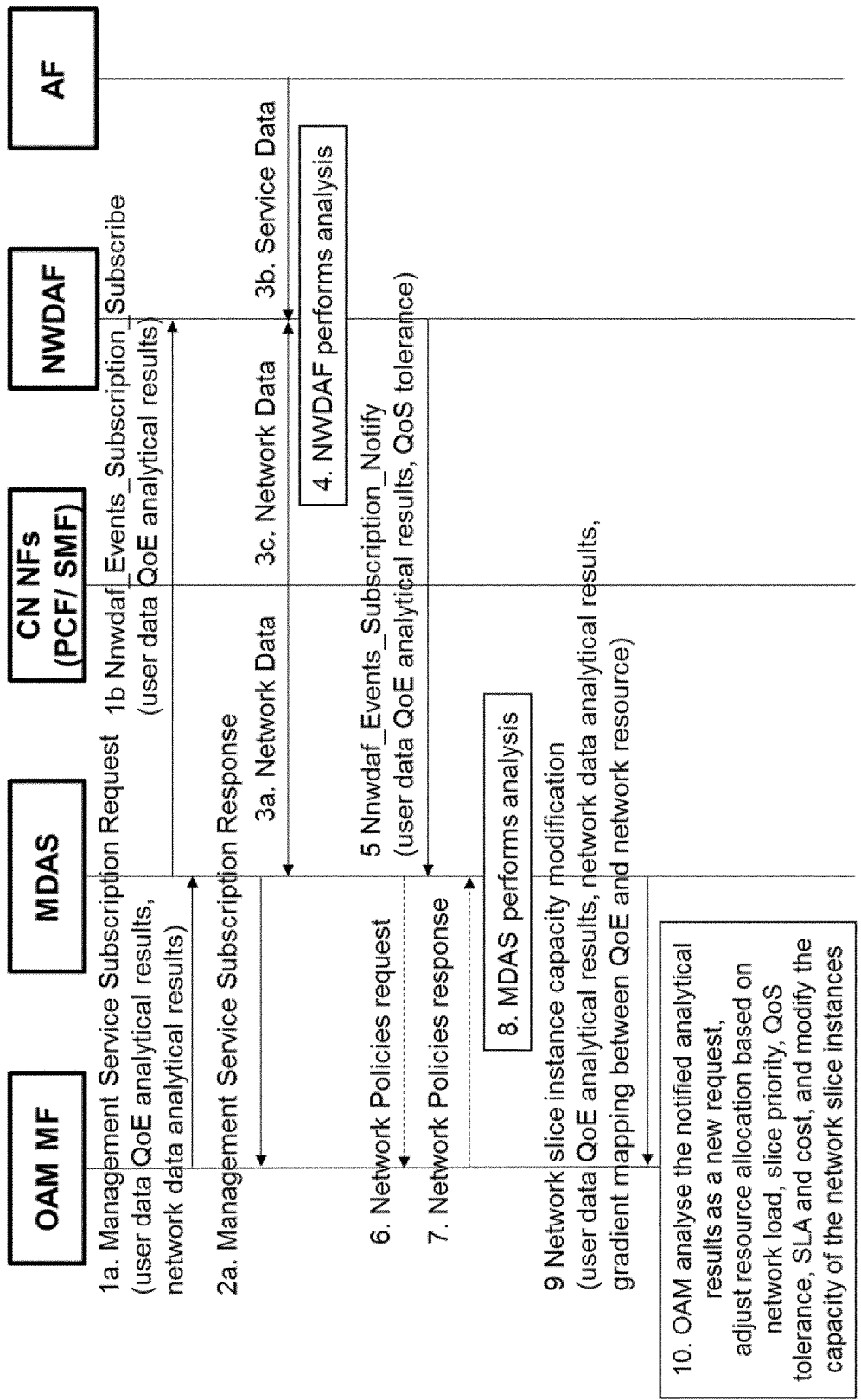

FIG. 7 demonstrates the procedures of network resource allocation in slice-based 5G system, in which an MDAS obtains related network policies from an OAM MF.

The OAM MF(s) requests notifications from the MDAS on changes in the analytics information by sending Management Service Subscription Request message or any other service procedure or message for the purpose of request to subscribe a management service from the MDAS. The message may include parameters; at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of relevant QoS parameters.

The MDAS subscribes to the NWDAF's service by sending Nnwdaf_Events_Subscription_Subscribe message or any other service procedure or message for the purpose of subscribing analytics and/or statistics information from the NWDAF.

The MDAS acknowledges OAM MF(s)' Subscription Request via a Management Service Subscription Response message.

The AF provides user data to the NWDAF, and one or more core network NF provide(s) a part of network data to the MDAS and a part of network data to the NWDAF. The Core Network NF(s) can be SMF, AMF, PCF, or any other NFs that can provide network data to the NWDAF. If the AF is trusted by the network operator, then the AF can send data to the NWDAF directly; if the AF is untrusted by the network operator, the AF will be connected to the NWDAF via a NEF. The part of network data sent to the MDAS by the core network NF can be QoS flow-related data, such as QoS flow Bit Rate, QoS flow Packet Delay, QoS flow packet Error Rate or any other relevant parameter. The part of network data sent to the MDAS by the core network NF can be whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualized Resource Utilization of Network Slice Instance.

The NDWAF performs data analytics based on the collected user service data and part of network data, and the analytical results may include parameters, at least one of user QoE analytical result or one of combined user QoE analytical result, network QoS/KPIs analytical results, and QoS tolerance. User QoE analytical result is the satisfactory score of users, and it can be a range of numbers, a percentage or a range of grades. QoS tolerance is QoS-to-QoE gradient.

The NWDAF notifies the MDAS with its analytics result information by sending a Nnwdaf_Events_Subscription_Notify message or any other service procedure or message for the purpose of notifying analytics and/or statistics information from the NWDAF which may include parameters at least one of user QoE analytical result and QoS tolerance. User QoE analytical result is the satisfactory score of users, and it can be a range of numbers, a percentage or a range of grades. QoS tolerance is QoS-to-QoE gradient.

The MDAS requests network policies, such as SLA, slice priority and cost, from the OAM MF.

The OAM MF provides the MDAS the required network policies.

The MDAS performs data analytics based on the collected network data, which includes radio network data, transport network data, core network data, and the NWDAF's analytical information (including QoS tolerance), the network policies, and its analytical results may include parameters, at least one of combined user QoE analytical result and network QoS/KPIs analytical results, the gradient mapping between network resource and user QoE, current and target user QoE, and cost. User QoE analytical result is the satisfactory score of users, and it can be a range of numbers, a percentage or a range of grades. QoS analytical results can be delay, jitter, throughput, or other kinds of QoS parameters.

The MDAS notifies the OAM MF(s) its analytics result information by sending Network slice instance capacity modification or any other service procedure or message for the purpose of notifying analytics and/or statistics information which may include parameters at least one of user QoE analytical result and network QoS/KPIs analytical results, the mapping between network resource and user QoE with QoS-to-QoE gradient, current and target user QoE, and cost. User QoE analytical result is the satisfactory score of users, and it can be a range of numbers, a percentage or a range of grades. QoS analytical results can be delay, jitter, throughput, or other kinds of QoS parameters.

The OAM MF(s) analyses the notified analytical results from the MDAS as a new request to modify the capacity of the network slice instances. After analyzing the request based on network load, SLA, slice priority, QoS tolerance, user QoE and cost, if it is needed, the OAM MF(s) will identify the related network slice(s), derive new network requirements, and initiates modification of the capacity of identified network slice(s) (e.g. increase the number of related NFs in the identified network slice(s)). It also can modify an existing NSI by using Network Slice Configuration service or any other dedicated service or procedure for the purpose. The action by the OAM MF(s) could be conducted at the constituents, i.e., network slice subnets and/or at the constituent NFs of network slice.

Scenario 2: MDAS Requests Network Policy from PCF

Figure 8:
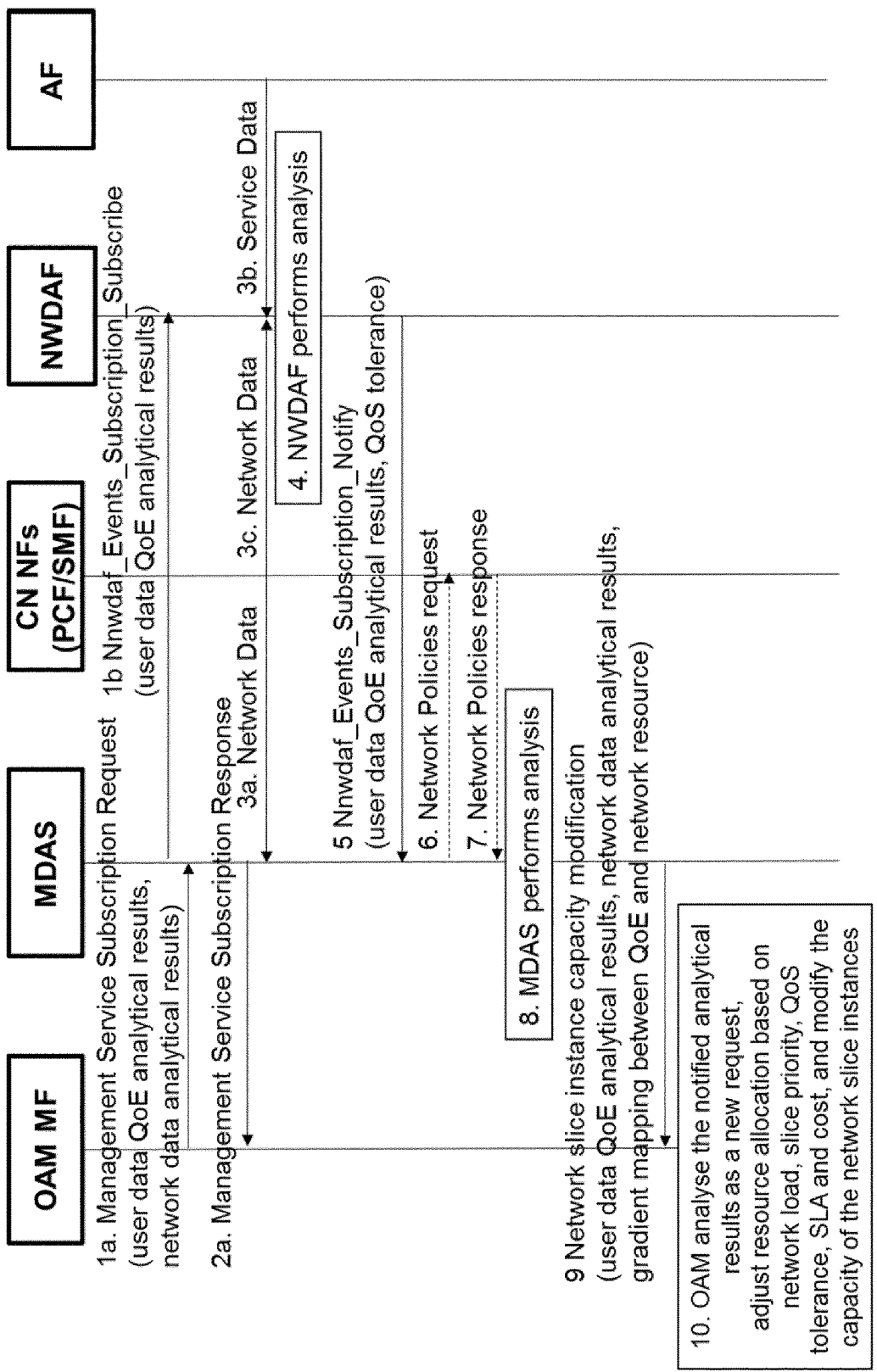

FIG. 8 demonstrates the procedures of network resource allocation in slice-based 5G system, in which an MDAS obtains related network policies from a PCF.

The OAM MF(s) requests notifications from the MDAS on changes in the analytics information by sending Management Service Subscription Request message or any other service procedure or message for the purpose of request to subscribe a management service from the MDAS. The message may include parameters; at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of relevant QoS parameters.

The MDAS subscribes to the NWDAF's service by sending a Nnwdaf_Events_Subscription_Subscribe message or any other service procedure or message for the purpose of subscribing analytics and/or statistics information from the NWDAF.

The MDAS acknowledges the OAM MF(s)' Subscription Request via a Management Service Subscription Response message.

The AF provides user data to the NWDAF, and one or more core network NF provide(s) a part of network data to the MDAS and a part of network data to the NWDAF. The Core Network NF(s) can be SMF, AMF, PCF, or other NFs that can provide network data to the NWDAF. If the AF is trusted by the network operator, then the AF can send data to the NWDAF directly; if the AF is not trusted by the network operator, then the AF will be connected to the NWDAF via a NEF. The part of network data sent to the MDAS by the core network NF(s) can be QoS flow-related data, such as QoS flow Bit Rate, QoS flow Packet Delay, QoS flow packet Error Rate. The part of network data sent to the MDAS by the core network NF(s) can be whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.

The NDWAF performs data analytics based on the collected user service data and part of network data, and the analytical results may include parameters, at least one of user QoE analytical result or one of combined user QoE analytical result, network QoS/KPIs analytical results, and QoS tolerance. User QoE analytical result is the satisfactory score of users, and it can be a range of numbers, a percentage or a range of grades. QoS tolerance is QoS-to-QoE gradient.

The NWDAF notifies the MDAS with its analytics result information by sending a Nnwdaf_Events_Subscription_Notify message or any other service procedure or message for the purpose of notifying analytics and/or statistics information from the NWDAF which may include parameters at least one of user QoE analytical result and QoS tolerance. User QoE analytical result is the satisfactory score of users, and it can be a range of numbers, a percentage or a range of grades. QoS tolerance is QoS-to-QoE gradient.

The MDAS requests network policies, such as SLA, slice priority and cost, from the PCF.

The PCF provides the MDAS the required network policies.

The MDAS performs data analytics based on the collected network data, which includes radio network data, transport network data, core network data, and the NWDAF's analytical information (including QoS tolerance), the network policies, and its analytical results may include parameters, at least one of combined user QoE analytical result and network QoS/KPIs analytical results, the gradient mapping between network resource and user QoE, current and target QoE and cost. User QoE analytical result is the satisfactory score of users, and it can be a range of numbers, a percentage or a range of grades. QoS analytical results can be delay, jitter, throughput, or other kinds of QoS parameters.

The MDAS notifies the OAM MF(s) its analytics result information by sending Network slice instance capacity modification or any other service procedure or message for the purpose of notifying analytics and/or statistics information which may include parameters at least one of user QoE analytical result and network QoS/KPIs analytical results, the mapping between network resource and user QoE with QoS-to-QoE gradient, current and target QoE and cost. User QoE analytical result is the satisfactory score of users, and it can be a range of numbers, a percentage or a range of grades. QoS analytical results can be delay, jitter, throughput, or other kinds of QoS parameters.

The OAM MF(s) analyses the notified analytical results from the MDAS as a new request to modify the capacity of the network slice instances. After analysing the request based on network load, SLA, slice priority, QoS tolerance, user QoE and cost, if it is needed, the OAM MF(s) will identify the related network slice(s), derive new network requirements, and initiates modification of the capacity of identified network slice(s) (e.g. increase the number of related NFs in the identified network slice(s)). It also can modify an existing NSI by using Network Slice Configuration service or any other dedicated service or procedure for the purpose. The action by the OAM MF(s) could be conducted at the constituents, i.e., network slice subnets and/or at the constituent NFs of network slice.

Embodiment 2: QoS Architecture, which can Support Non-Standard Applications

The main idea of this embodiment is to propose a new QoS architecture that can facilitate the negotiation between OTT service providers and operators and meets the requirements of 5G applications.

Figure 9:
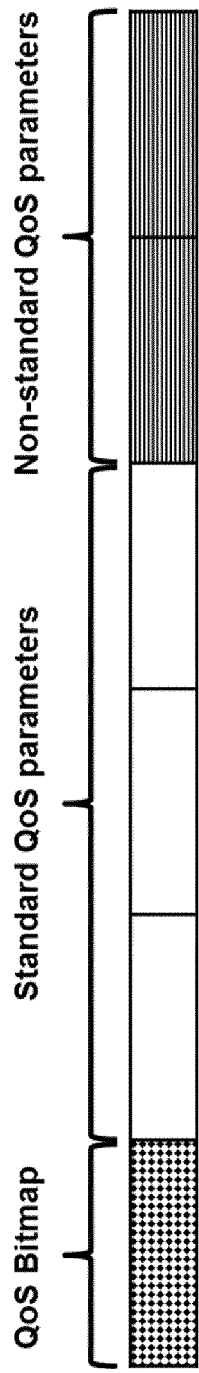
FIG. 9 illustrates schematically an exemplary QoS architecture in accordance with embodiments of the present invention.

FIG. 9 illustrates an example of such a QoS architecture, and its highlights are as follows:

It supports flexible QoS profiles based on QoS bitmap. Each bit represented one QoS parameter The length for the QoS bitmap is flexible. It is 32 bit, and can be extended to 64 bits or 128 bits in the future. If it is 32 bits, 16 bits will be allocated to standard QoS parameters and 16 bits will be allocated to non-standard QoS parameters.

It supports new applications defined by OTT service providers.

It starts with standard QoS parameters, and followed by non-standard or new parameters For each QoS type, there are two parts: Standard QoS parameters, which are defined by 3GPP; Non-standard QoS parameters, which are defined by network operators and OTT service providers Some QoS parameters can be normalised QoS parameters to facilitate OTT/operator/vendor Currently, there are six standard QoS parameters defined in 3GPP, i.e. Resource Type (which may be GBR, Delay critical GBR, or Non-GBR), Priority level, Packet Delay Budget, Packet Error Rate, Averaging window, and Maximum Data Burst Volume.

Figure 10:
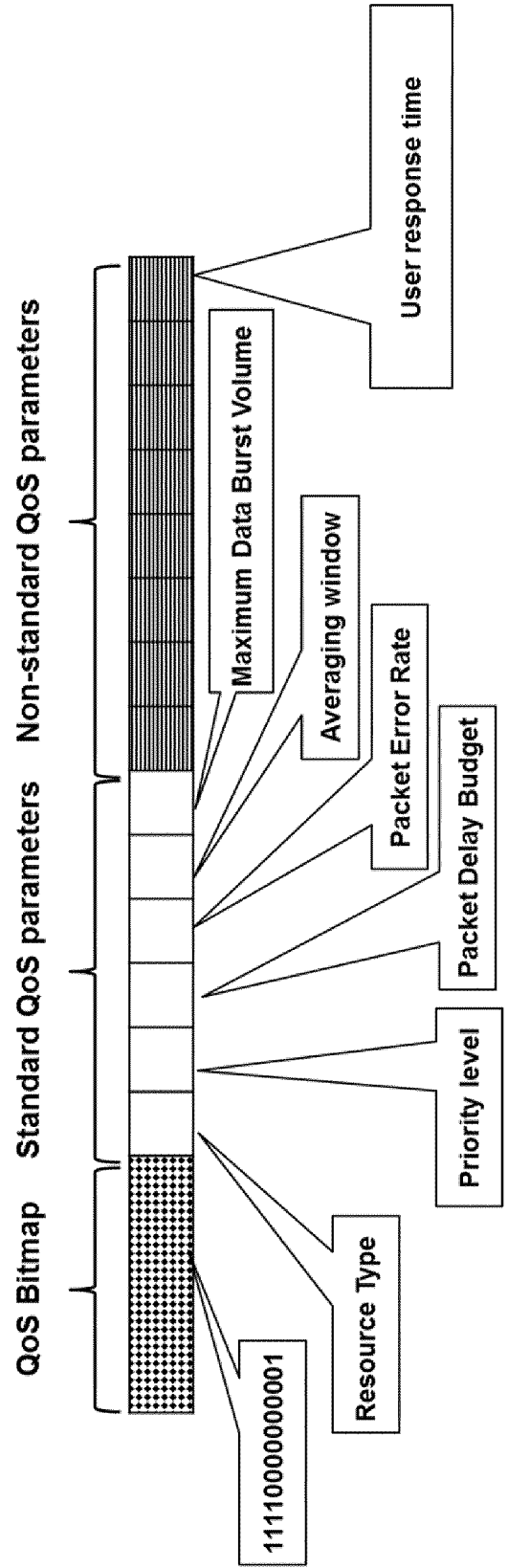
FIG. 10 illustrates schematically an exemplary QoS bitmap in accordance with the quality of service architecture shown in FIG. 9.

As shown in FIG. 10, for example, an OTT service provider has a new application, which uses standard QoS parameters Resource Type, Priority level, Packet Delay Budget, Packet Error Rate, and a non-standard QoS parameter "user response time". Its QoS bitmap will be, in this example, "111100" for standard QoS parameters, and "00000001" for non-standard QoS parameters. The overall QoS bitmap is "11110000000001". It is easy to accommodate new applications.

FIG. 10 illustrates schematically an exemplary QoS bitmap of a new application.

Figure 11:
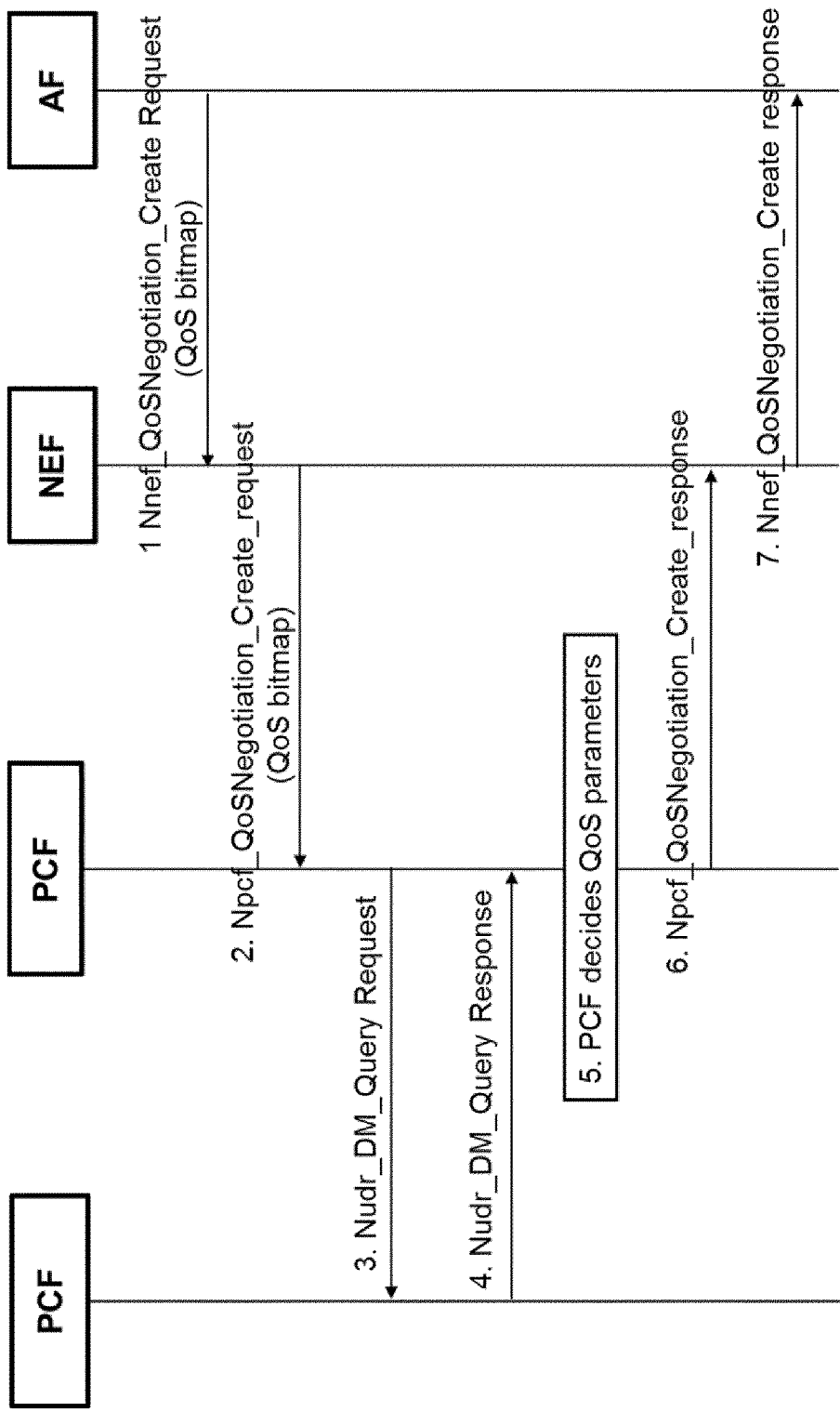
FIG. 11 illustrates an exemplary procedure for QoS negotiation for a new application using the QoS architecture and QoS bitmap shown in FIGS. 9 and 10.

FIG. 11 illustrates schematically an exemplary procedure for QoS negotiation of a new application.

After an OTT service provider and an operator signs a SLA, an AF invokes the Nnef_QoSNegotiation_Create service by sending a NEF a Nnef_QoSNegotiation_Create request message or any other service procedure or message for the purpose of initiating QoS negotiation with the network. The message may include parameters; at least one of which may be an appropriately formatted QoS bitmap.

Based on the AF's request, the NEF sends, to the PCF, a Npcf_QoSnegotiation_Create request message or any other service procedure or message for the purpose of initiating QoS negotiation with network. The message may include parameters; at least one of which may be an appropriately formatted QoS bitmap.

The PCF may request from the UDR the stored QoS policies using an Nudr_DM_Query (Policy Data) service operation.

The UDR provides all the stored policies to the PCF.

The PCF determines QoS parameters/policies for the new application based on the information provided by the AF and other available information (e.g. PCC rules).

The PCF sends an acknowledge message to the NEF with the new QoS parameters/policies.

The NEF sends an acknowledge message to the AF with the new QoS parameters/policies.

Summary

In summary, the central controller uses QoE targets rather than QoS targets and learns the best QoS parameters to meet such QoE targets. When there is a resource deficit (when not all QoE targets can be met) the central controller is able to make compromises, using the QoS-to-QoE gradient to discern between slices that have a QoE model less or more sensitive to QoS parameter changes.

Beneficially, the above described exemplary embodiments include, although they are not limited to, one or more of the following functionalities:

A new ML-based multi-agent architecture, which can optimally allocate network resource against target user QoE in multiple network slices environment has been proposed. In this architecture, there is an agent to use RL algorithms to find the mapping network resource and target user QoE with QoS-to-QoE gradient. This Agent also learns and monitors its QoS tolerance of user applications in the network slice. QoS tolerance is a novel parameter. The central controller calculate and allocate the resource based on network resource allocation state in the entire network, slice priority, QoS tolerance, the mapping between network resource and user QoE with QoS-to-QoE gradient, current and target user QoE and the cost to change resource allocation among network slices. In this way, network operators can adjust network resource based on user QoE and therefore optimize network resource allocation.

Using the gradient mapping between network resource and user QoE based on QoS tolerance and learned from reinforcement learning pave a new way for resource allocation in slice-based network.

The above description proposes a QoS architecture to facilitate the negotiation between OTT service providers and operators and accommodate new 5G applications. It not only can support applications with new QoS requirement that can be standardized, but also can support new applications defined by OTT service providers.

The above embodiments describe exemplary methods in which:

Embodiment 1

Core network NFs provides OAM user QoE and QoS tolerance information.

The gradient mapping between network resource allocation parameter and user QoE based on QoS tolerance is utilized for network automation.

OAM allocates network resource based on network resource allocation state in the entire network, slice priority, QoS tolerance, the mapping between network resource and user QoE with QoS-to-QoE gradient, current and target user QoE and the cost to change resource allocation among network slices.

Embodiment 2

OTT service providers and operators negotiated QoS provisioning using the QoS architecture is based on QoS bitmap, and can support non-standardized new applications defined by OTT service providers.

Benefits

The proposed embodiments allow optimizing the network resource allocation based on the data analytics utilizing QoS tolerance.

Modifications and Alternatives

Detailed embodiments have been described above. As those skilled in the art will appreciate, a number of modifications and alternatives can be made to the above embodiments whilst still benefiting from the inventions embodied therein. By way of illustration, exemplary alternatives and modifications will now be described.

In the above embodiments, a central controller is used. However, it will be appreciated that a distributed controller may be used instead, or a plurality of local 'sub-controllers' may be used to perform the functionalities of a central controller in a specific part of the network.

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above embodiments are also applicable to 'non-mobile' or generally stationary user equipment.

The information relating to a QoS tolerance may comprise a function (e.g. a QoS-to-QoE gradient) mapping a sensitivity of a particular QoE to changes in at least one associated QoS parameter. The information identifying a mapping between network resource allocations and a QoE associated with a user may be obtained using machine learning (e.g. value iteration, Q-learning, and/or the like). The information identifying a mapping between network resource allocations and a QoE associated with a user may be obtained by an agent associated with said at least one slice.

The allocating said at least a portion of said network resources to said at least one slice may be further based on at least one of: a current network load; a service level agreement (SLA); a respective priority associated with said plurality of slices; and a cost associated with said network resources.

The network resources may comprise at least one of: physical network resources; virtualised network resources; radio network resources; transport network resources; core network resources; and end-to-end network resources.

For a particular service, there may be at least one QoS parameter indicated via said first field and at least one QoS parameter indicated via said second field.

The method for configuring a QoS may further comprise: obtaining information identifying at least one requirement for said service; and determining said QoS parameter based on said at least one requirement.

The second field may comprise a plurality of bits, each bit indicating a respective application defined by a service provider. The size of the bitmap may be flexible (e.g. 32 bits, 64 bits, or 128 bits). The signalling said determined at least one QoS parameter may comprise transmitting, to a Network Exposure Function (NEF) or a Policy Control Function (PCF), a message for negotiating a QoS parameter (e.g. a 'Nnef_QoSNegotiation_Create' message, a 'Npcf_QoSnegotiation_Create' message, and/or the like).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Abbreviations and Terminology

3GPP 3rd Generation Partnership Project
5GS 5G System
5QI 5G QoS Indicator
AF Application Function
KPI Key Performance Indicator
MDAS Management Data Analytics Service
ML Machine Learning
NEF Network Exposure Function
NF Network Function
NWDAF Network Data Analytics Function
OAM Operations, Administration and Maintenance
OTT Over the Top
PCC Policy and Charging Control
PCF Policy Control Function
QoE Quality of Experience
QoS Quality of Service
RL Reinforcement learning
SMF Session Management Function
UE User Equipment

LIST OF REFERENCES

[1] 3GPP TS 23.501 V15.2.0
[2] 3GPP TS 23.502 V15.2.0
[3] 3GPP TS 23.503 V15.2.0
[4] 3GPP TR 23.791 V0.5.0

The invention claimed is:

1. A method performed by an agent for a network slice, the method comprising:
  receiving user data for a user from an application function (AF);
  receiving network data from the AF and a Network Function (NF) in a 3rd Generation Partnership Project (3GPP) network;
  obtaining information relating to a quality of service (QoS) tolerance for a respective quality of experience (QoE) associated with the user for the network slice based on the user data and a part of the network data, wherein the information relating to the QoS tolerance comprises a gradient function mapping a sensitivity of the respective QoE to changes in at least one QoS parameter, and is used to generate a target QoE;
  obtaining information identifying a mapping between network resource allocations for the network slice and the respective QoE associated with the user, based on the information relating to the QoS for the respective QoE tolerance associated with the user and the network data;
  providing to a controller in an Operations, Administration and Maintenance (OAM) system for allocating at least a portion of the network resources per network slice:
    i) the information identifying the mapping between network resource allocations for the network slice and the respective QoE;
    ii) the information relating to the QoS tolerance for the network slice; and
    iii) information identifying a current QoE and the target QoE for the network slice per user, and wherein
  the information identifying the mapping, the information relating to the QoS tolerance, and the information identifying a current QoE and the target QoE causes the controller to determine a deficit in available network resources for allocation per network slice, and to determine a sensitivity of gradient function of the QoS tolerance per network slice, for allocating, by the controller, the available network resources per network slice based on the mapping, the QoS tolerance and the current QoE and the target QoE, and the sensitivity of the gradient function of the QoS tolerance per network slice.

2. The method according to claim 1, wherein the obtaining the information identifying the mapping between network resource allocations and the respective QoE associated with the user is performed by using machine learning.

3. A network function comprising a controller, and a transceiver, wherein the controller is configured to perform the method according to claim 1.

4. The method according to claim 1, wherein the QoS tolerance indicates a margin to a minimal QoS requirement.

5. The method according to claim 1, wherein:
  the agent comprises a Management Data Analytics Service (MDAS) node in the OAM system and a Network Data Analytic Function (NWDAF) node in the 3GPP network,
  the calculating information relating to the QoS tolerance is performed by the NWDAF node in the agent, and
  the calculating information identifying the mapping is performed by the MDAS node in the agent.

6. The method according to claim 1, further comprising:
  receiving, at the OAM system, at least one network policy from the controller, and
  wherein the obtaining the information identifying the mapping is further based on the at least one network policy.

7. A method performed by a controller in an Operations Administration and Maintenance (OAM) system, the method comprising:
  receiving, from at least one agent for a respective network slice:
    i) information identifying a mapping between network resource allocations for the respective network slice and a quality of experience (QoE) associated with a user;
    ii) information relating to a quality of service (QoS) tolerance for a particular QoE for the respective network slice, wherein the information relating to the QoS tolerance comprises a gradient function mapping a sensitivity of the respective QoE to changes in at least one associated QoS parameter; and
    iii) information identifying a current QoE and a target QoE for the respective network slice, wherein the target QoE was generated using the information related to the QoS tolerance;

determining a deficit in available network resources for allocation per network slice;

determining a sensitivity of a gradient function of a QoS tolerance per network slice; and allocating the available network resources per network slice based on the mapping, the QoS tolerance and the current QoE and the target QoE, and the sensitivity of the gradient function of the QoS tolerance per network slice.

8. The method according to claim 7, wherein the allocating the available network resources per network slice is further based on at least one of:

a current network load;

a service level agreement;

a respective priority corresponding to respective network slices; and a cost associated with the network resources.

9. The method according to claim 7, wherein the network resources comprise at least one of:

physical network resources;

virtualised network resources;

radio network resources; transport network resources;

core network resources; and end-to-end network resources.

10. A network function comprising a controller, and a transceiver, wherein the controller is configured to perform the method according to claim 7.

11. The network function according to claim 10, wherein the controller is further configured to allocate the available network resources per network slice based on at least one of:

a current network load;

a service level agreement;

a respective priority corresponding to the respective network slices; and a cost associated with the network resources.

12. The method according to claim 7, further comprising:

receiving, from another agent for another network slice:

i) information identifying another mapping between the network resource allocations for the other network slice and a second quality of experience (QoE) associated with another user;

ii) information relating to another quality of service (QoS) tolerance for another QoE for the other network slice, wherein the other QoS tolerance and the other mapping are used to generate another target QoE; and iii) information identifying another current QoE and another target QoE for the other network slice per user; and allocating at least a portion of the network resources to the other network slice based on the other mapping, QoS tolerance, the current QoE, the target QoE, the other QoS tolerance, the other current QoE, and the other target QoE.

13. The method according to claim 7, wherein the QoS tolerance indicates a margin to a minimal QoS requirement.

14. The method according to claim 7, wherein:

the at least one agent comprises a Management Data Analytics Service (MDAS) node in the OAM system and a Network Data Analytic Function (NWDAF) node in a 3GPP network, calculating information relating to the QoS tolerance is performed by the NWDAF node in the agent, and calculating information identifying the mapping is performed by the MDAS node in the agent.

15. The method according to claim 7, further comprising:

providing at least one network policy by the controller to the at least one agent, and wherein the obtaining the information identifying the mapping is further based on the at least one network policy.

16. A method performed by a controller in an Operations Administration and Maintenance (OAM) systems, the method comprising:

receiving, from at least one agent for a network slice of a plurality of network slices:

(i) information identifying a mapping between network resource allocations and a respective quality of experience (QoE) associated with a user;

(ii) information relating to a quality of service (QoS) tolerance for the respective QoE for the network slice, wherein the information relating to the QoS tolerance comprises a gradient function mapping a sensitivity of the respective QoE to changes in at least one associated QoS parameter; and (iii) information identifying a current QoE and a target QoE for the network slice, wherein the target QoE was generated using the information related to the QoS tolerance; and receiving, from another agent for another network slice of the plurality of network slices:

(i) information identifying another mapping between network resource allocations for the other network slice and a second quality of experience (QoE) associated with a second user;

(ii) information relating to a second quality of service (QoS) tolerance for a different QoE, wherein the other QoS tolerance and the other mapping are used to generate another QoE; and (iii) information identifying another current QoE and a another target QoE for the other network slice per user; and allocating at least a portion of the network resources to the other network slice based on the other mapping, QoS tolerance, the current QoE, the target QoE, the other QoS tolerance, the other current QoE, and the other target QoE, wherein allocating the network resources comprises:

determining a deficit in available network resources for allocation for the network one slice and the other network slice in the plurality of slices;

determining a sensitivity of a gradient function of the second QoS tolerance and a sensitivity of the gradient function of the QoS tolerance; and allocating the available network resources to the network slice and the other network slice of the plurality of slices based on the sensitivities of the gradient functions.

\* \* \* \* \*